US010735265B2

(12) United States Patent
Dunn et al.

(10) Patent No.: US 10,735,265 B2
(45) Date of Patent: Aug. 4, 2020

(54) TRANSACTION MONITORING FOR REMOTE UPDATE OF WIRELESS ROUTER ACCOUNT SETTINGS

(71) Applicant: T-Mobile USA, Inc., Bellevue, WA (US)

(72) Inventors: Timothy Dunn, Issaquah, WA (US); Frank Bilger, Redmond, WA (US); David Maqueda, Mission, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 137 days.

(21) Appl. No.: 15/944,753

(22) Filed: Apr. 3, 2018

(65) Prior Publication Data

US 2019/0306025 A1 Oct. 3, 2019

(51) Int. Cl.
| | |
|---|---|
| H04L 12/24 | (2006.01) |
| G06F 8/65 | (2018.01) |
| H04W 4/14 | (2009.01) |
| H04L 29/06 | (2006.01) |
| H04W 12/06 | (2009.01) |
| G06F 16/903 | (2019.01) |
| H04W 84/04 | (2009.01) |

(52) U.S. Cl.
CPC ........... *H04L 41/0889* (2013.01); *G06F 8/65* (2013.01); *G06F 16/90335* (2019.01); *H04L 41/0813* (2013.01); *H04L 63/08* (2013.01); *H04L 63/101* (2013.01); *H04W 4/14* (2013.01); *H04W 12/06* (2013.01); *H04L 41/5061* (2013.01); *H04L 41/5077* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2011/0125807 A1* | 5/2011 | Bland | H04L 29/12188 707/803 |
| 2012/0108237 A1* | 5/2012 | Schatzmayr | H04L 29/12188 455/435.1 |

\* cited by examiner

Primary Examiner — Ayaz R Sheikh
Assistant Examiner — Sori A Aga
(74) Attorney, Agent, or Firm — Han Santos, PLLC (57) ABSTRACT

Transaction monitoring for remotely updating account settings of a wireless router includes a first transaction that is initiated by an issue tracking computer platform in response to an issue tracking event. The issue tracking computer platform then generates a change order that includes one or more changes to make to the account settings as well as user indicia identifying a user of a wireless communication network. A service management computer platform receives the change order and initiates a second, nested, transaction to monitor a status of the change order. The service management computer platform then queries a user database with the user indicia to retrieve a wireless router indicia and then triggers an update of the account settings. The second transaction is closed in response to determining that the update is successful and the first transaction is closed in response to determining that the second transaction is successful.

20 Claims, 7 Drawing Sheets

TRANSACTION MONITORING FOR REMOTE UPDATE OF WIRELESS ROUTER ACCOUNT SETTINGS

BACKGROUND

Wireless communication networks are widely deployed to provide various types of communication content, such as voice, data, and so on. Typical wireless communication networks may be multiple-access systems capable of supporting communication with multiple users by sharing available system resources (e.g., bandwidth, transmission power, etc.). Earlier examples of such multiple-access systems may include code division multiple access (CDMA) systems, time division multiple access (TDMA) systems, and frequency division multiple access (FDMA) systems, and more recent examples include orthogonal frequency division multiple access (OFDMA) systems and the like. Additionally, the systems can conform to specifications such as third generation partnership project (3GPP), 3GPP long-term evolution (LTE), ultra mobile broadband (UMB), evolution data optimized (EV-DO), etc.

Generally, wireless multiple-access communication systems may simultaneously support communication for multiple wireless devices. Each wireless device may communicate with one or more base stations via transmissions on forward and reverse links. The forward link (or downlink) refers to the communication link from base stations to wireless devices, and the reverse link (or uplink) refers to the communication link from wireless devices to base stations.

To supplement conventional base stations, additional low-power wireless routers may be deployed to provide more robust wireless coverage to wireless devices. For example, low-power wireless routers (e.g., which can be commonly referred to as femto nodes, femtocell nodes, pico nodes, micro nodes, etc.) that participate within a cellular provider's network can be deployed for incremental capacity growth, richer user experience, in-building or other specific geographic coverage, and/or the like. By way of another example, an independent wireless router using unlicensed bandwidth may be adapted to operate in a typical WiFi deployment model, while providing similar, if not the same, quality of service (QoS), mobility, and security as regular LTE (e.g., macro base stations provided by a mobile network operator (MNO)). The wireless router may be particularly targeted for non-MNOs (e.g., personal homes, businesses, etc.).

In a home/business deployment of a wireless router, the owners of the home/business deploy the wireless router located on their premises. In some configurations, such low-power wireless routers are connected to the Internet via broadband connection (e.g., digital subscriber line (DSL) router, cable or other modem, etc.), which can provide the backhaul link to the mobile network operator (MNO). In other examples, the wireless router may be configured to connect to a neighboring macro cell base station via in-band communications to provide the backhaul link.

In some implementation models, the MNO distributes and/or sells a wireless router to customers for home or other local use to provide an additional point of access to the wireless communication network operated by the MNO. Those wireless routers may be associated with a number of users, such as under a family plan or other group plan. When the people comprising the family or group for the plan account changes, such as when an individual member of a family changes coverage, or when an enterprise group adds or removes employees, the wireless router typically has to be reconfigured to reflect that change. Conventional processes for a change to the group are the same as the termination of the wireless router. For example, the wireless router may be required to be physically returned back to the MNO and either the same wireless router (after reconfiguration) or a replacement wireless router (with the new configuration) is sent back to the user. However, the time that it typically takes to reconfigure the same wireless router and/or send a newly configured wireless router to the user is typically long (e.g., weeks), resulting in an undesirable period of time where the user's locale does not have use of the wireless router.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Aspects of the present disclosure are directed to computing platforms (i.e., apparatus), computer-readable media, and processes for utilizing transaction monitoring in the remote updating of wireless router account settings with respect to a wireless communication network. In some aspects, a mobile network operator (MNO) may employ several independent systems for managing various aspects of the wireless communication network. For example, the MNO may include one computer platform for customer-related issue tracking and another computer platform for performing service management functions.

An issue tracking computer platform may be employed by the MNO that enables customer service representatives (CSRs) to enter and track issue tracking events, such as trouble tickets. The issue tracking events may be initiated by a customer contacting (e.g., by voice call, text messaging, chat interface on the web, etc.) the CSR to request account changes, and/or to report problems with service or hardware.

The MNO may also employ a service management computer platform that may be utilized by technical specialists (e.g., engineers) to provision and configure various wireless devices, as well as to configure and control access to various communication services offered by the MNO by way of the wireless communication network.

Thus, the updating of the account settings of a wireless router may involve multiple independent systems, such as the issue tracking computer platform and the service management computer platform. For example, the initial request to change the account settings of a wireless router may originate by way of a customer contacting the CSR, where the CSR then creates a trouble ticket by way of the issue tracking computer platform. However, the actual updating of the wireless router to reflect the changes to the account settings is accomplished by way of the service management computer platform. In typical systems, the issue tracking computer platform and the service management computer platform are autonomic to one another. That is, the issue tracking computer platform may operate independently of the service management computer platform and vice versa. In addition, the service management computer platform may have access to account and/or hardware settings that are inaccessible from the issue tracking computer platform. Thus, while conventional MNO systems may provide the ability to allow a CSR to create an issue tracking event corresponding to a request to change the account settings of a wireless router, as mentioned above, such a request typically requires the customer to physically return the wireless router so that a technical specialist may update the account settings in person.

Accordingly, aspects of the present disclosure provide an underlying technical configuration of an MNO's customer care and service management to obviate an unnecessary return of a wireless router when the account settings are changing rather than terminating service. Further aspects of the present disclosure provide the CSR with the ability to reconfigure the wireless router, thereby streamlining processing, and enabling more immediate service.

As mentioned above, several independent computer platforms may be involved in the same process of updating the account settings of a wireless router. As will be described in more detail below, aspects of the present disclosure may utilize a transaction monitor to ensure that these separate systems stay consistent with each other. For example, a transaction monitor may be used to ensure that operations that comprise the updating of account settings across multiple systems either all occur or all roll back to an initial state. In other words, the issue tracking computer platform, user databases, and the service management computer platform all update together, or rollback to the same initial state. In this way, for example, the transaction monitor would prevent changes to a user database if an update of the wireless router fails.

In particular, a transaction is a set of operations that satisfy the so-called "ACID" properties; atomic, consistent, isolated, and durable. Atomic transactions mean that all operations that are part of the transaction either all execute completely, or all are rolled back as to revert to their original state. For example, in a transaction where a first bank account is debited and a second bank account is credited, in order to transfer funds, both the debit and credit operations either both execute completely or both roll back to their original state. Failure to do so would either result in a loss of funds in the first bank account, or in a creation of funds in the second bank account without a source.

Consistent transactions mean that at the beginning and at the end of the transaction, that all operations are always in a state that agree with each other. In the debit-credit example, this means that money is neither destroyed nor created, but rather the total amount of money stays the same.

Isolated transactions mean that a plurality of transactions may occur concurrently, and that (short of computing resource management), two transactions do not interfere with each other and do not have visibility to each other.

Durable transactions mean that the transaction state is persisted. In particular, if a computer is shut off, the state is stored on a non-volatile storage medium so that when the computer is turned back on, the transaction state may be recovered. The result is that a transaction does not rely on whether a computer is turned on or not.

Transaction monitors are software that create transactions around operations to be transacted. One example includes Microsoft Distributed Transaction Coordinator™. Other transaction monitors include functionality embedded in databases including relational databases such as Oracle™ and Microsoft SQL Server™.

The techniques described herein may be implemented in a number of ways. Example implementations are provided below with reference to the following figures.

Example Network Architecture

Figure 1:
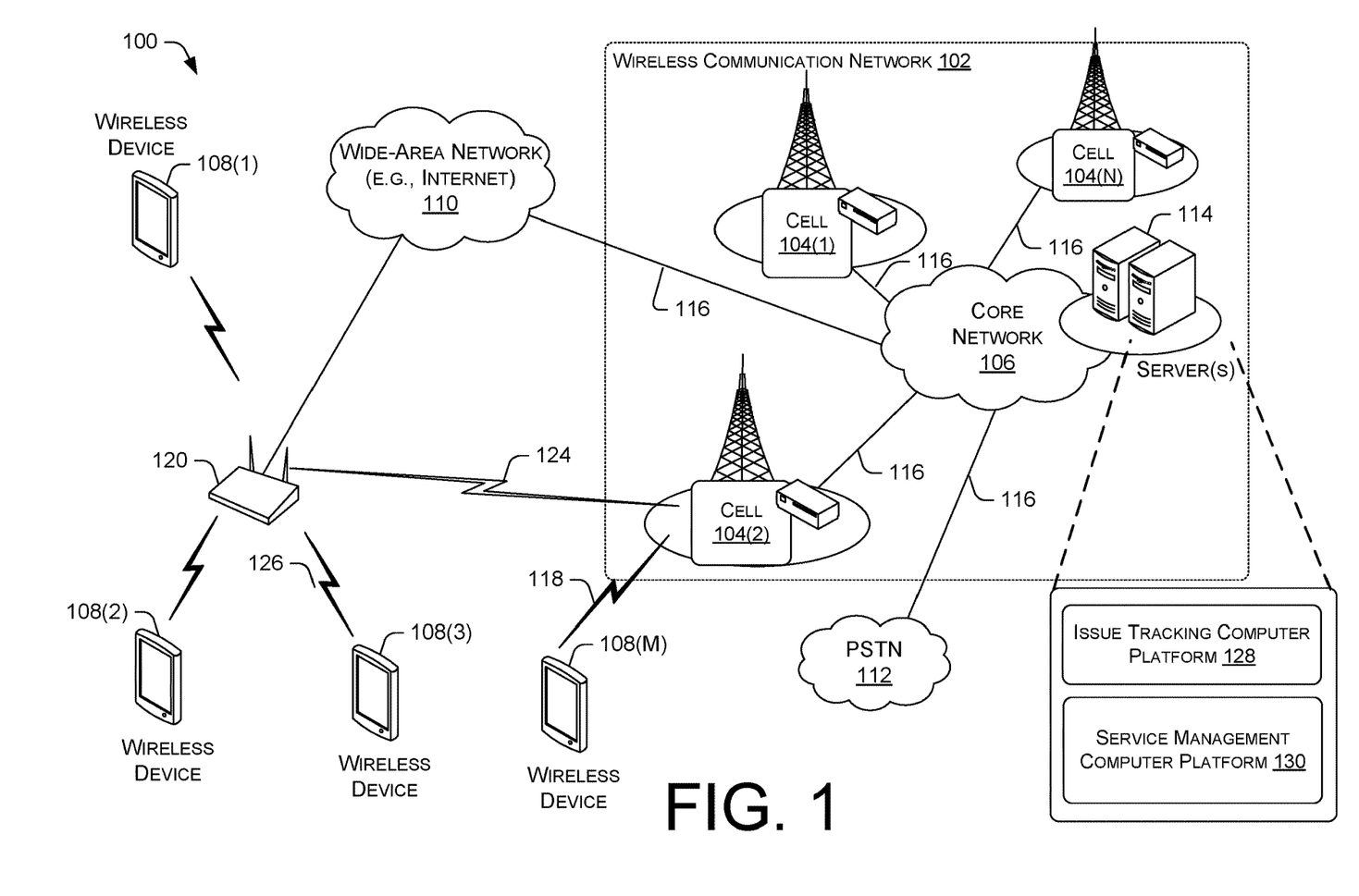
FIG. 1 illustrates an example architecture for the deployment of a wireless router.

FIG. 1 illustrates an example architecture 100 for the deployment of a wireless router 120. The example architecture 100 of FIG. 1 is illustrated as including a wireless communication network 102, cells 104(1)-(N), a core network 106, wireless devices 108(1)-(M), a wide area network 110, public switched telephone network (PSTN) 112, one or more servers 114, and the wireless router 120. Also illustrated in FIG. 1 are backhaul links 116, a UE-to-cell wireless link 118, an in-band communication link 124, and UE-to-router wireless link 126.

In one aspect, the wireless router 120 is deployed to supplement the coverage of cells 104(1)-(N). As used herein, the term "wireless router" generally refers to a class of low-powered access points that may include or be otherwise referred to as WiFi routers. As noted above, the small low-power wireless routers may be distributed by a Mobile Network Operator (MNO) to extend or otherwise improve access to wireless communication network 102.

In one aspect, the wireless communication network 102 is provided and operated by an MNO. The illustrated wireless communication network 102 is a multiple-access system that is divided into a plurality of cells 104(1)-(N) and configured to support communication for a number of wireless devices. Communication coverage in each of the cells 104(1)-(N) is provided by a corresponding base station, which interacts with one or more wireless devices 108(1)-(M) via Down-Link (DL) and/or UpLink (UL) connections. In general, the DL corresponds to communication from a base station to a wireless device, while the UL corresponds to communication from a wireless device to a base station.

As used herein, the terms "wireless device", "base station", "wireless router", and "access point" are not intended to be specific or otherwise limited to any particular Radio Access Technology (RAT), unless otherwise noted. In general, such wireless devices 108(1)-(M) may be any wireless communication device (e.g., a mobile phone, router, personal computer, server, etc.) used by a user to communicate over a communications network, and may be alternatively referred to in different RAT environments as an Access Terminal (AT), a Mobile Station (MS), a Subscriber Station (STA), a User Equipment (UE), etc. Similarly, a base station, access point, and wireless router may operate according to one of several RATs in communication with user devices depending on the network in which it is deployed, and may be alternatively referred to as an Access Point (AP), a Network Node, a NodeB, an evolved NodeB (eNB), etc.

Returning to FIG. 1, the cells 104(1)-(N) may be referred to as macro cells and may be configured to provide communication coverage within a macro cell coverage area, which may cover a few blocks within a neighborhood or several square miles in a rural environment. Meanwhile, the wireless router 120 is configured to provide communication coverage within a respective small coverage area with varying degrees of overlap existing among the different coverage areas. In some systems, each cell may be further divided into one or more sectors (not shown).

Turning to the illustrated connections in more detail, the wireless device 108(N) may transmit and receive messages via a UE-to-cell wireless link 118 with the macro cell 104(2), where the messages include information related to various types of communication (e.g., voice, data, multimedia services, associated control signaling, etc.). The wireless devices 108(1)-(3) may similarly communicate with the wireless router 120 via another wireless link. In addition, in some scenarios, one or more of the wireless devices 108(1)-(M) may also communicate with one or more macro cells 104(1)-(N) via a separate wireless link in addition to the wireless link it maintains with the wireless router 120.

As is further illustrated in FIG. 1, the wireless router 120 may communicate with a wide area or external network 110, via a wired link or via a wireless link. For example, the wireless router 120 may communicate with the wide area network 110 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The wide area network 110 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the wide area network 110 includes network variations such as the public Internet, a private network within the Internet, a secure network within the Internet, a private network, a public network, a value-added network, an intranet, and the like. In certain systems, the wide area network 110 may also comprise a Virtual Private Network (VPN).

Accordingly, the macro cells 104(1)-(N) and/or the wireless router 120 may be connected to the wide area network 110 using any of a multitude of devices or methods. These connections may be referred to as the "backbone" or the "backhaul" of the network, and may in some implementations be used to manage and coordinate communications between the cells 104(1)-(N) and core network 106. In this way, as a wireless device 108 moves through such a mixed communication network environment that provides both macro cell and wireless router coverage, the wireless device 108 may be served in certain locations by macro cell base stations, at other locations by a wireless router, and, in some scenarios, by both a macro cell and a wireless router.

In one aspect, the wireless router 120 may use unlicensed spectrum (as defined by the FCC) such as WiFi. In this case, the wireless router 120 may be connected to the internet or other network services via a wide area network 110. The wireless router 120 may act as an access point for wireless devices 108(1)-108(3) and perform data offload services to carry traffic, e.g., voice and data traffic, to reduce load on the core network 106. Example 3GPP standards to effect data offload include LTE-U (Long Term Evolution-Unlicensed) and LAA (Licensed Assisted Access). In other cases, the wireless router 120 may carry all data such as for WiFi calling, WiFi video conferencing and WiFi media streaming.

In another aspect, the wireless router 120 may instead, or in addition, use licensed spectrum (as defined by the FCC), and may either wirelessly or via physical wire connect to a macrocell that is in the vicinity of the wireless router 120. For example, the wireless router 120 may link 124 with the cell 104(2) in order to access the backhaul link 116 of the cell 104(2). Accordingly, the wireless router 120 may route backhaul traffic of the wireless devices 108(1)-108(3) to and from the core network 106. Specifically, a wireless in-band link 124 formed between the wireless device 120 and the cell 104(2), and a second link is the backhaul link 116 that is between cell 104(2) and the core network 106.

For their wireless air interfaces, each cell 104(1)-(N) and wireless router 120 may operate (e.g., via UE-to-cell wireless link 118, in-band communication link 124, and/or UE-to-router wireless link 126) according to one of several RATs depending on the network in which it is deployed. These networks may include, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement a RAT such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

Although different licensed frequency bands have been reserved for such communications (e.g., by a government entity such as the Federal Communications Commission (FCC) in the United States), certain communication networks, in particular those employing wireless routers, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi." Thus, in one example, wireless router 120 may be configured to communicate with the wireless devices 108(1)-(M) via UE-to-router wireless link 126 that operates in accordance with Wi-Fi.

The cells 104(1)-104(N) and wireless router 120 are responsible for handling voice and data traffic between wireless devices, such as wireless devices 108(1)-108(M), and the core network 106. Each of the cells 104(1)-104(N) may be communicatively connected to the core network 106 via a corresponding backhaul. Each of the backhauls may be implemented using copper cables, fiber optic cables, microwave radio transceivers, and/or so forth. For example, the cell 104(2) may be communicatively connected by backhaul link 116 to the core network 106.

The core network 106 may provide telecommunication and data communication services to the wireless devices 108(1)-108(M). For example, the core network 106 may connect the wireless devices 108(1)-108(M) to other telecommunication and data communication networks, such as the Internet 110 and the public switched telephone network (PSTN) 112. In various aspects, the core network 106 may include one or more servers 114 that implement network entities. For example, the network entities may include a serving GPRS support node (SGSN) that routes voice calls to and from the PSTN 112, a Gateway GPRS Support Node (GGSN) that handles the routing of data communication between external packet switched networks and the core network 106. The network entities may further include a Packet Data Network (PDN) gateway (PGW) that routes data traffic between the GGSN and the Internet 110.

Furthermore, the network entities provided by the one or more servers 114 may include an issue tracking computer platform 128 and a service management computer platform 130. The issue tracking computer platform 128 may be utilized by the MNO to enable CSRs to enter and track issue tracking events, such as trouble tickets. The issue tracking events may be initiated by a customer contacting (e.g., by voice call, text messaging, chat interface on the web, etc.) the CSR to request changes, such as a request to change one or more account settings of wireless router 120.

Figure 2:
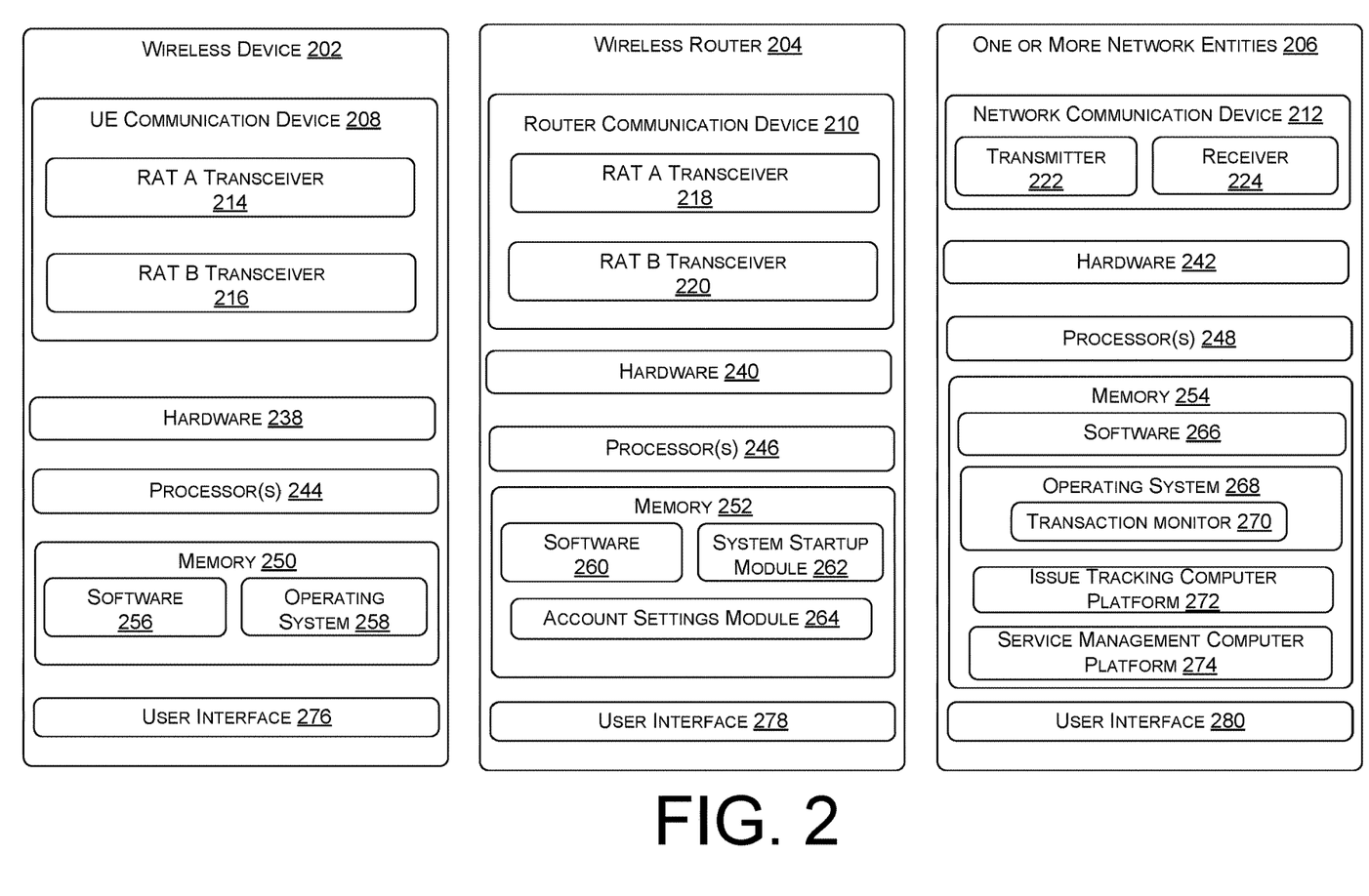
FIG. 2 is a simplified block diagram illustrating several sample aspects of components that may be employed in a wireless device, a wireless router, and a network entity.

The service management computer platform 130 may be utilized by the MNO to provision and configure various devices, such as wireless router 120. Thus, the updating of the account settings of wireless router 120 may involve multiple independent systems, such as the issue tracking computer platform 128 and the service management computer platform 130. However, as mentioned above, the issue tracking computer platform 128 and the service management computer platform 130 are autonomic to one another. That is, the issue tracking computer platform 128 may operate independently of the service management computer platform 130 and vice versa. In addition, the service management computer platform 130 may have access to various user databases that include account and/or hardware settings that are inaccessible directly from the issue tracking computer platform 128. As will be described in more detail below, aspects of the present disclosure may utilize a transaction monitor to ensure that these separate systems stay consistent with each other when remotely updating the account settings of the wireless router 120. Example Computing Device Components FIG. 2 is a simplified block diagram illustrating several sample aspects of components that may be employed in a wireless device 202, a wireless router 204, and one or more network entities 206. Wireless device 202 is one possible implementation of one or more of the wireless devices 108(1)-(M) of FIG. 1, while wireless router 204 is one possible implementation of wireless router 120 of FIG. 1, and the one or more network entities 206 are one possible implementation of one or more servers 114 of FIG. 1. The components illustrated in FIG. 2 may be implemented in different types of apparatuses in different implementations (e.g., in an ASIC, in an SoC, etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The wireless device 202 and the wireless router 204 each include at least one wireless communication device (represented by the UE communication device 208 and the router communication device 210) for wirelessly communicating with other nodes via at least one designated RAT. In general, the wireless device 202 and wireless router 204 may communicate via the wireless links (e.g., wireless links 118, 124, and/or 126 of FIG. 1) according to one or more RATs depending on the network in which they are deployed. In the example of FIG. 2, the UE communications device 208 of the wireless device 202 includes two co-located transceivers operating according to respective RAT types, including a "RAT A" transceiver 214 and a "RAT B" transceiver 216. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a Wi-Fi chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The RAT A transceiver 214 and the RAT B transceiver 216 may be of different RAT types, may provide different functionalities, and may be used for different purposes. As an example, the RAT A transceiver 214 may be a Long-Term Evolution (LTE) wireless communication transceiver that operates in accordance with Long Term Evolution (LTE) technology to provide communication with a macro cell (e.g., cell 104(2) of FIG. 1) on a respective wireless link, while the RAT B transceiver 216 may operate in accordance with Wi-Fi technology to communicate via Wi-Fi signaling to or from wireless router 204. In one example, the RAT B transceiver 216 of wireless device 202 is the only wireless communication transceiver included in the wireless device 202. That is, the wireless device 202 may include a wireless communication transceiver of one RAT type (e.g., Wi-Fi), but may omit additional transceivers of other RAT types (e.g., LTE). The router communication device 210 of the wireless router 204 may include a similar RAT A transceiver 218 of a first RAT type (e.g., LTE) and a RAT B transceiver 220 of a second RAT type (e.g., Wi-Fi).

The one or more network entities 206 may include at least one network communication device (represented by the network communication device 212) for communicating with other nodes. For example, the network communication device 212 may comprise a network interface that is configured to communicate with one or more network entities via a wire-based or wireless links. In some aspects, the network communication device 212 may be implemented as a transceiver configured to support wire-based or wireless signal communication. This communication may involve, for example, sending and receiving: messages, parameters, or other types of information. Accordingly, in the example of FIG. 2, the network communication device 212 is shown as comprising a transmitter 222 and a receiver 224. Similarly, wireless device 202, as well as wireless router 204 may comprise a network interface that is configured to communicate with one or more network entities via a wire-based or wireless link.

The wireless device 202, wireless router 204, and the one or more network entities 206 also include other components that may be used in conjunction with the operations as taught herein. For example, the wireless device 202 may include hardware 238, one or more processors 244, memory 250, and a user interface 276. Similarly, the wireless router 204 includes hardware 240, one or more processors 246, memory 252, and an optional user interface 278. Furthermore, the one or more network entities 206 may include hardware 242, one or more processors 248, memory 254, and a user interface 280.

The respective hardware 238, 240, and 242 may include additional hardware interfaces, data communications, and/or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

In addition, the wireless device 202, wireless router 204, and the one or more network entities 206 may include user interfaces 276, 278, and 280, respectively, for providing indications (e.g., audible and/or visual indications) to a user and/or for receiving user input (e.g., upon user actuation of a sensing device such a keypad, a touch screen, a microphone, and so on).

The respective memories 250, 252, and 254 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The respective controllers and processors of wireless device 202, wireless router 204, and the one or more network entities 206 may execute instructions and perform tasks under the direction of software components that are stored in their respective memories 250, 252, and 254.

For example, the memory 250 may store various software components that are executable or accessible by the one or more processors 244 of the wireless device 202. The various components may include software 256 and an operating system 258. The software 256 and operating system 258 may include routines, program instructions, objects, and/or data structures that perform particular tasks or implement particular abstract data types.

By way of another example, the memory 252 of wireless router 204 may store various software components that are executable or accessible by the one or more processors 246 of the wireless router 204. The various components may include software 260, a system startup module 262, and an account settings module 264. The software 260, system startup module 262, and account settings module 264 may include routines, program instructions, objects, and/or data structures that perform particular tasks or implement particular abstract data types. In one aspect, the software 260, system startup module 262, and account settings module 264 enable the wireless router 204 to perform functions and control hardware components of the wireless router 204. For example, the system startup module 262 may include one or more instructions, which when executed by the one or more processors 246 direct the wireless router 204 to perform operations related to the startup of the wireless router 204 after a reset. In particular, upon a reset of the wireless router 204 (e.g., power cycling), the system startup module 262 may include instructions to direct the wireless router 204 to establish a communication link with the core network (e.g., core network 106 of FIG. 1) and to receive updated account settings from the one or more network entities 206 (if updated account settings are available).

The account settings module 264 may include instructions and/or components that enable the wireless router 204 to receive and store account settings related to the operation of the wireless router 204. For example, in one aspect, the account settings may include a set of allowable users which provides an indication to the wireless router 204 as to which devices and/or users are permitted access to the wireless communication network 102 via the wireless router 204. In one example, the set of allowable users are stored in memory 252 of the wireless router 204 as an access control list (ACL).

In yet another example, the memory 254 of the one or more network entities 206 may store various software components that are executable or accessible by the one or more processors 248. The various components may include software 266, an operating system 268, an issue tracking computer platform 272, and a service management computer platform 274. The software 266, operating system 268, issue tracking computer platform 272, and service management computer platform 274 may include routines, program instructions, objects, and/or data structures that perform particular tasks or implement particular abstract data types. In one aspect, the software 266, operating system 268, issue tracking computer platform 272, and service management computer platform 274 enable the one or more network entities 206 to perform functions and control hardware components of the one or more network entities 206.

For example, the issue tracking computer platform 272 may include one or more instructions, which when executed by the one or more processors 248, direct the one or more network entities 206 to perform operations related to customer-based issue tracking. For example, the issue tracking computer platform 272 may provide a customer service representative (CSR) with a user interface (e.g., by way of user interface 280) to enable CSRs to enter and track issue tracking events, such as trouble tickets. As mentioned above, such issue tracking events may be initiated by a customer contacting the CSR to request changes, such as a request to change one or more account settings of wireless router 120.

In another example, the service management computer platform 274 may include one or more instructions, which when executed by the one or more processors 248, direct the one or more network entities 206 to perform operations related to the remote provisioning and configuration of various devices, such as wireless router 204. As mentioned above, the issue tracking computer platform 272 and the service management computer platform 274 are autonomic to one another, where the issue tracking computer platform 272 operates independently of the service management computer platform 274 and vice versa. Accordingly, as shown in FIG. 2, a transaction monitor 270 may be utilized to ensure that these separate systems stay consistent with each other when updating the account settings of the wireless router 204.

In practice, some enterprises, such as the MNO that operates wireless communication network 102 of FIG. 1, may maintain enterprise-wide computing systems having many (e.g., thousands) of computing resources in communication with each other to carry out various transactions. Thus, enterprise computing systems, such as those provided by operating system 268, may include a transaction monitor 270 that monitors the transactions between various computing resources.

In at least one aspect, a transaction is one or more operations that make up a unit of work performed by one or more computer platforms. For example, an operation to delete a particular database record and an operation to update another database record may be operations included in a particular transaction. When a transaction is successful, all of the corresponding operation(s) are executed successfully, (e.g., successfully deleting and updating the database records). When a transaction is unsuccessful, one or more of the operations have failed (e.g., a database record is deleted and a database record to be updated has not occurred). Thus, transaction monitor 270 may be configured to ensure that operations that comprise the updating of the account settings of a wireless router, either all occur or all roll back to an initial state. That is, the transaction monitor 270 may control the issue tracking computer platform 272, any utilized user databases, and the service management computer platform 274, such that they all update together upon a successful transaction, or all rollback to the same initial state upon detecting an unsuccessful transaction. In this way, for example, the transaction monitor 270 would prevent changes to a user database if an update of the wireless router 204 fails.

The wireless device 202, wireless router 204, and the one or more network entities 206 are shown in FIG. 2 as including various components that may be configured according to the various examples described herein. It will be appreciated, however, that the illustrated blocks may have different functionality in different designs.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 270, 272, and 274 may be implemented by processor and memory component(s) of the one or more network entities (e.g., by execution of appropriate code and/or by appropriate configuration of processor components). Similarly, some or all of the functionality represented by blocks 262 and 264 may be implemented by processor and memory component(s) of the wireless router 204 (e.g., by execution of appropriate code and/or by appropriate configuration of processor components).

Figure 3:
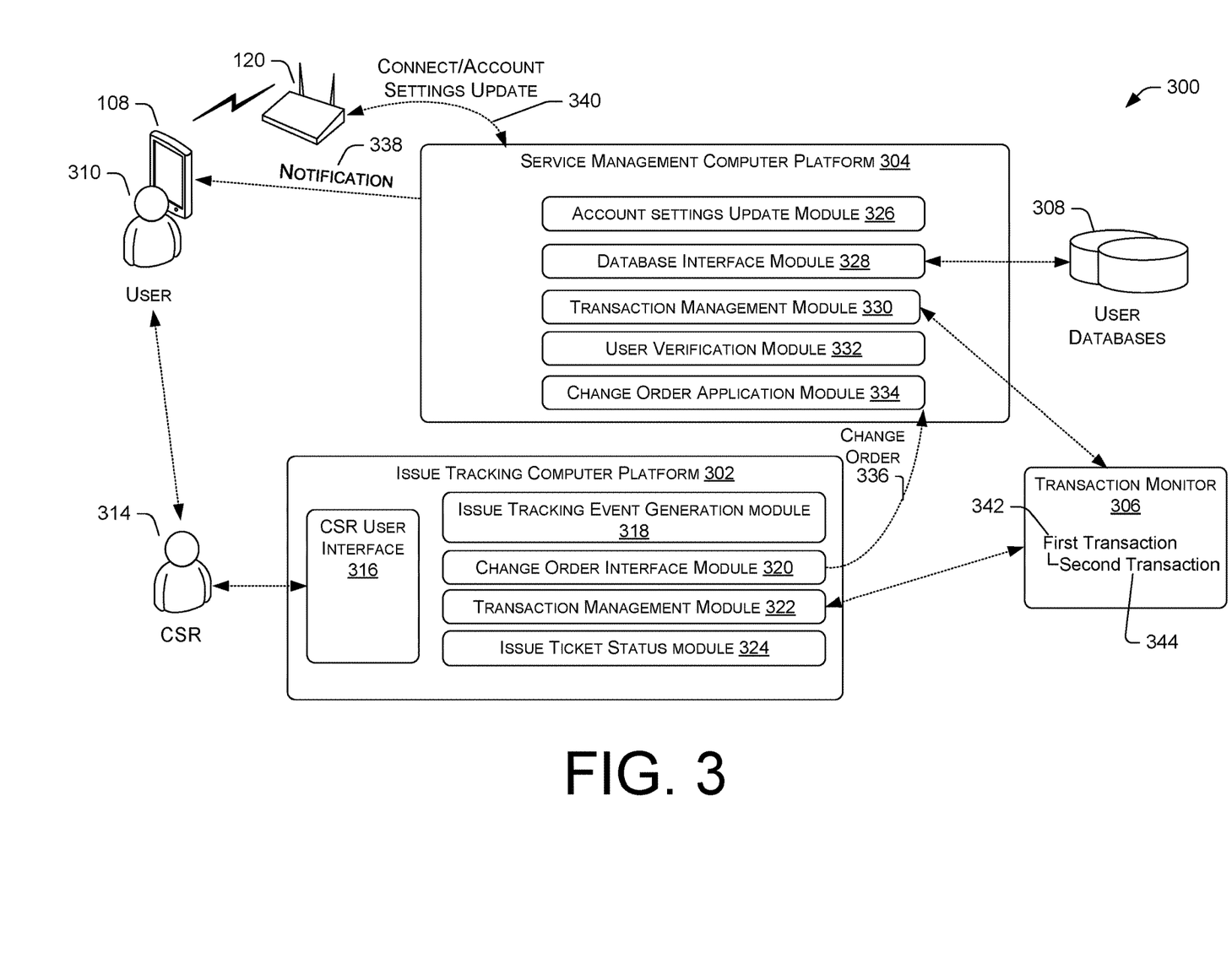
FIG. 3 illustrates an example architecture for transaction monitoring for the remote updating of wireless router account settings.

FIG. 3 illustrates an example architecture 300 for transaction monitoring for the remote updating of wireless router account settings. The illustrated example of architecture 300 includes an issue tracking computer platform 302, a service management computer platform 304, one or more user databases 308, and a transaction monitor 306. Issue tracking computer platform 302 is one possible implementation of issue tracking computer platform 128 of FIG. 1 and/or issue tracking computer platform 272 of FIG. 2. Service management computer platform 304 is one possible implementation of service management computer platform 130 of FIG. 1 and/or service management computer platform 274 of FIG. 2. Transaction monitor 306 is one possible implementation of transaction monitor 270 of FIG. 2. Also shown in FIG. 3 are wireless router 120, wireless device 108, a user 310, and a customer service representative (CSR) 314.

The illustrated example of issue tracking computer platform 302 is shown as including a CSR user interface 316, an issue tracking event generation module 318, a change order interface module 320, a transaction management module 322, and an issue ticket status module 324. The illustrated example of service management computer platform 304 is shown as including an account setting update module 326, a database interface module 328, a transaction management module 330, a user verification module 332, and a change order application module 334.

The operation of the architecture of FIG. 3 will now be described with additional reference to process 400 of FIG. 4. In a process block 402, the issue tracking computer platform 302 generates an issue tracking event in response to a request to modify the account settings of a wireless router (e.g., wireless router 120). For example, in one scenario, a user 310 contacts CSR 314 to request a change to one or more account settings associated with a wireless router 120. In one aspect, the user 310 may contact the CSR 314 by way of a voice call, text message, chat interface on the web, etc. The requested change to the one or more account settings may include a request to add or remove a user who is authorized to use the wireless router 120. In response to receiving the request, the CSR 314 engages the issue tracking event generation module 318 via the CSR user interface 316 to generate the issue tracking event (also referred to as a trouble ticket). In one aspect, generating the issue tracking event includes associating the issue tracking event with both a user indicia that identifies the user 310, as well as with information that specifies the one or more requested changes to the account settings (e.g., add/remove user).

Next, in process block 404, the issue tracking computer platform 302 initiates a first transaction 342 to monitor a status of the issue tracking event. For example, the transaction management module 322 may be configured to communicate with the transaction monitor 306 to initiate the first transaction 342 in response to the issue tracking event generation module 318 generating an issue tracking event that corresponds to the requested update of the account settings of the wireless router 120.

In a process block 408, change order interface module 320 generates a change order 336 with the change order application module 334 of the service management computer platform 304. In one aspect, a change order is work that is to be performed by the service management computer platform 304. By way of example, the change order application module 334 may maintain a queue (not illustrated) of received change orders that relate to various device configurations, provisioning, account changes, etc. that are to be performed by the service management computer platform 304.

In one aspect, the change order application module 334 includes one or more application programming interfaces (APIs) to enable the change order interface module 320 to trigger the generation of the change order 336 at the service management computer platform 304. The change order 336, itself, may include at least the user indicia that identifies the user 310 as well as information that identifies the one or more changes that are to be made to the account settings of the wireless router 120.

Figure 4:
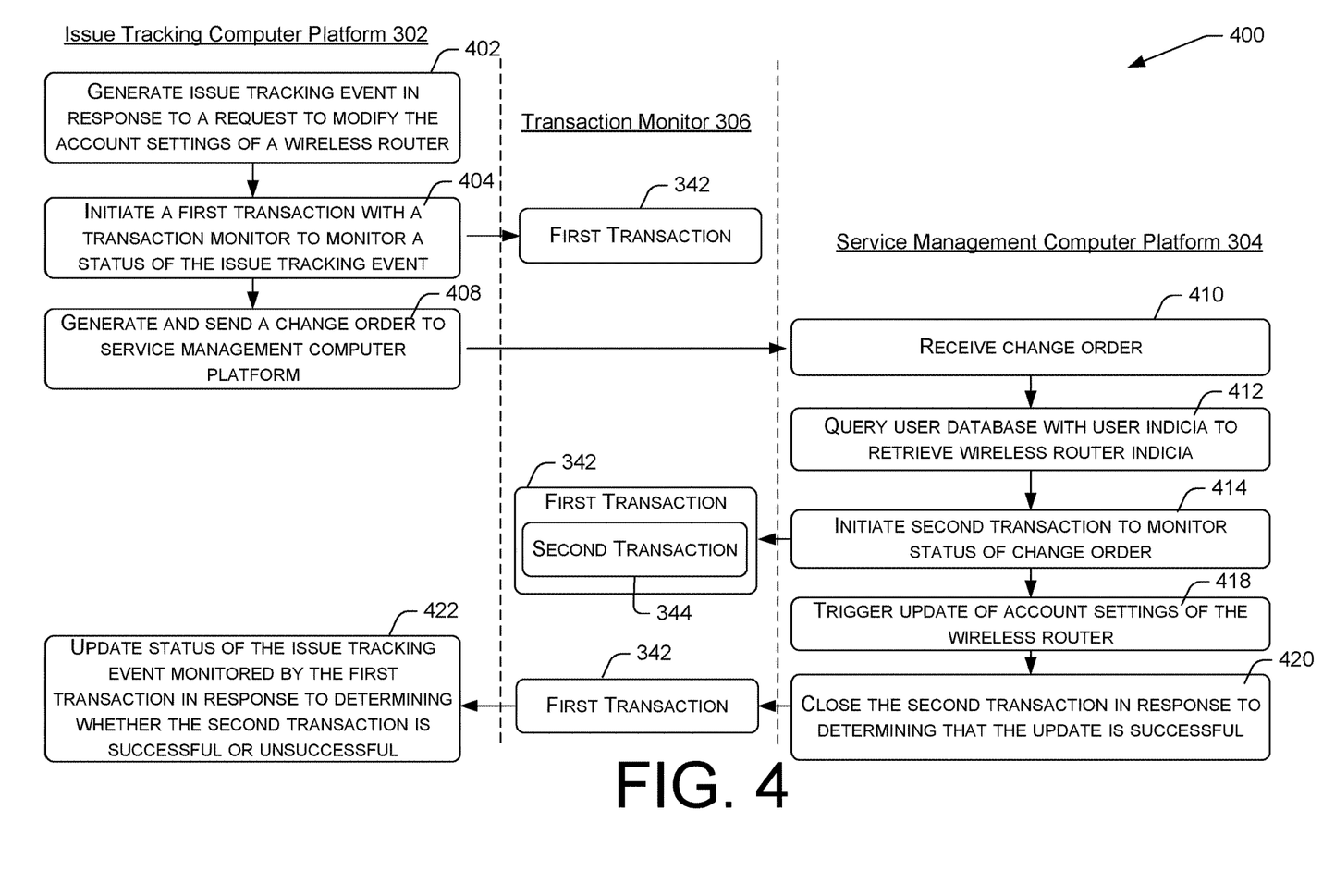
FIG. 4 is a flow diagram of an example process for transaction monitoring for the remote updating of wireless router account settings.

Thus, in process block 410 of FIG. 4, the change order application module 334 receives the change order 336. In response to receiving the change order 336, the database interface module 328 may query one or more user databases 308 with the user indicia to retrieve a wireless router indicia. That is, the one or more user databases 308 may include a mapping of user indicia to wireless routers that are associated with that user. In one example, the wireless router indicia includes a media access control (MAC) address and/or internet protocol (IP) address of the wireless router 120. As mentioned above, the service management computer platform 304 and the issue tracking computer platform 302 may be independent systems that are autonomic from one another. Thus, in one example, the issue tracking computer platform 302 is isolated from accessing the one or more user databases 308. In other words, the issue tracking computer platform 302 may be unable to access (e.g., read, write, etc.) to/from the one or more user databases 308 either due to technical constraints, or in some cases, intentionally, in order to control access to the customer data stored in the user databases 308.

Next, in process block 414, the service management computer platform 304 initiates a second transaction 344 to monitor the status of the change order 336. For example, the transaction management module 330 may be configured to communicate with the transaction monitor 306 to initiate the second transaction 344 in response to receiving the change order 336 and/or in response to retrieving the wireless router indicia from the one or more user databases 308. In one example, the second transaction 344 is nested within the first transaction 342. Thus, the first transaction 342 may be determined to be successful only if the second transaction 344 is determined to be successful. Similarly, the first transaction 342 is determined to be unsuccessful in response to determining that the second transaction 344 is unsuccessful.

In one aspect, the second transaction 344 includes one or more operations to be performed by the service management computer platform 304 to implement the one or more changes to the account setting of the wireless router 120. For example, the second transaction 344 may include one or more operations such as deleting one or more records from the one or more user databases 308, inserting (e.g., writing) one or more new records to the one or more user databases 308 (new records that reflect the one or more changes to make to the account settings), staging an update of the wireless router 120, notifying the user 310 to reset the wireless router 120, and communicating with the wireless router 120 to update the wireless router 120 to reflect the one or more changes to the account settings. Thus, as will be described in more detail below, if any of the operations associated with the second transaction 344 fail, then the second transaction 344 is determined to be unsuccessful and the service management computer platform 304 is "rolled back" to an initial state. That is, the initial state is the state of the service management platform 304 and user databases 308 at the time the second transaction 344 was initiated. By way of example, if the second transaction 344 is determined to be unsuccessful (e.g., over-the-air update of wireless router 120 failed), then the one or more new records that were inserted into the databases 308 are removed and the one or more records that were deleted are restored to the one or more databases 308.

In one aspect, the service management computer platform 304 may be configured to determine whether the user 310 qualifies to make the one or more changes to the device settings prior to initiating the second transaction 344. In one example, initiating the second transaction 344 is in response to determining that the user qualifies to make the one or more changes, and where the first transaction 342 is determined to be unsuccessful in response to determining that the user 310 does not qualify to make the one or more changes. Verifying that the user 310 qualifies to make the one or more changes to the account setting may be performed, in one aspect, by user verification module 332. User verification module 332 may verify the user 310 based on one or more factors, such as the location coordinates of the wireless router 120, which cells are neighbor cells of the wireless router 120, a device use address of the wireless router 120, and/or a usage address of the wireless router 120.

Returning now to process 400 of FIG. 4, process block 418 includes the service management computer platform 304 triggering the update of the account settings of the wireless router 120. In one aspect, the triggering of the update includes triggering the service management computer platform 304 to perform all operations associated with the second transaction 344. For example, the update of the account settings may include the account settings update module 326 communicating with the one or more databases 308 (e.g., via the database interface module 328) to delete one or more records from the one or more user databases 308 and to insert one or more new records to the one or more user databases 308 to reflect the one or more changes to make to the account settings. As mentioned above, the request to make one or more changes to the account settings may include a request to add or delete one or more users to a set of allowable users (i.e., users who are allowed to connect to the wireless router 120). Thus, deleting the record from the one or more databases 308 may include deleting an initial set of allowable users, and inserting a new set of allowable users (e.g., initial set of allowable users with added or deleted users) to the one or more databases 308.

In one example, the update of the account settings of the wireless router may further include updating an emergency service address (e.g., e-911 address) associated with the wireless router 120.

In one example, after the one or more databases 308 are updated to reflect the changes to the account settings, the account settings update module 326 may stage an update of the wireless router 120, itself. In one aspect, the wireless router 120 is configured to connect to the core network 106 upon a reset of the wireless router. In one aspect, when wireless router 120 first connects to the core network 106 (e.g., via connection 340), any updates to the account settings may be pushed to the wireless router 120. Thus, staging the update may include packaging information (e.g., data, instructions, etc.), that once transmitted to the wireless router 120, direct the wireless router 120 to update its settings based on the one or more changes. Then, the account settings update module 326 may notify the user 310 to perform a reset of the wireless router 120. For example, in one aspect the account settings update module 326 may send a notification 338 to a wireless device 108 associated with the user 310. In one example, the notification 338 is sent to the wireless device 108 via a text message. The notification 338 may include instructions and/or directions for the user 310 to reset the wireless router 120. In one aspect, resetting the wireless router 120 may include first turning off the wireless router 120 and then turning the wireless router 120 back on.

As mentioned above, with reference to FIG. 2, the wireless router 120 may include a system startup module 262 configured to direct the wireless router 120 to establish a connection (e.g., connection 340) with the core network 106 upon a reset. Upon connecting to the core network 106, the updates may then be pushed to the wireless router 120, where the account setting module 264 (e.g., see FIG. 2) may then implement the one or more changes. In one example, the update pushed to the wireless router 120 may include an updated access control list (ACL) that reflects the requested change to one or more users allowed to use the wireless router 120.

Furthermore, in one aspect communicating the changes to the wireless router 120 may include wirelessly communicating the changes to the wireless router via wireless communications network 102. For example, wirelessly communicating the changes may include an over-the-air update by communicating the changes via the in-band communication link 124 between the wireless router 120 and the cell 104(2) (e.g., see FIG. 1). In another example, communicating the changes may include communicating the changes via the wide-area network 110.

If all the operations associated with the second transaction 344 are determined to be successful (e.g., user databases 308 updated and wireless router 120 updated), then the account setting update module 326 may close the second transaction 344 (i.e., process block 420). In one aspect, closing the second transaction 344 may include the transaction management module 330 communicating with the transaction monitor 306.

As mentioned above, the second transaction 344 is nested within the first transaction 342. Thus, in one aspect, transaction monitor 306 may update a status (e.g., second transaction 344 successful) of the first transaction 342 in response to the closing of the second transaction 344. In one example, the transaction management module 322 of the issue tracking computer platform 302 may receive an indication from the transaction monitor 306 that the update of the account settings was successful. Accordingly, in process block 422, the issue tracking computer platform 302 may update the status of the issue tracking event in response to determining whether the second transaction 344 is successful or unsuccessful. In one aspect, upon determining that the second transaction 344 was successful, the issue ticket status module 324 may change the status of the issue tracking event to trigger one or more actions that are to be performed by the CSR 314. For example, the issue ticket status module 318 may update the status of the issue tracking event to prompt the CSR 314 (e.g., by way of CSR user interface 316) to notify the user 310 that the update of the account settings has been completed. Upon verifying with the user 310 that the update was successful, the CSR 314 may then close the issue tracking event (e.g., mark as completed). The transaction management module 322 may then communicate with the transaction monitor 306 to close the first transaction 342 in response to the closing of the issue tracking event by the CSR 314.

Figure 5:
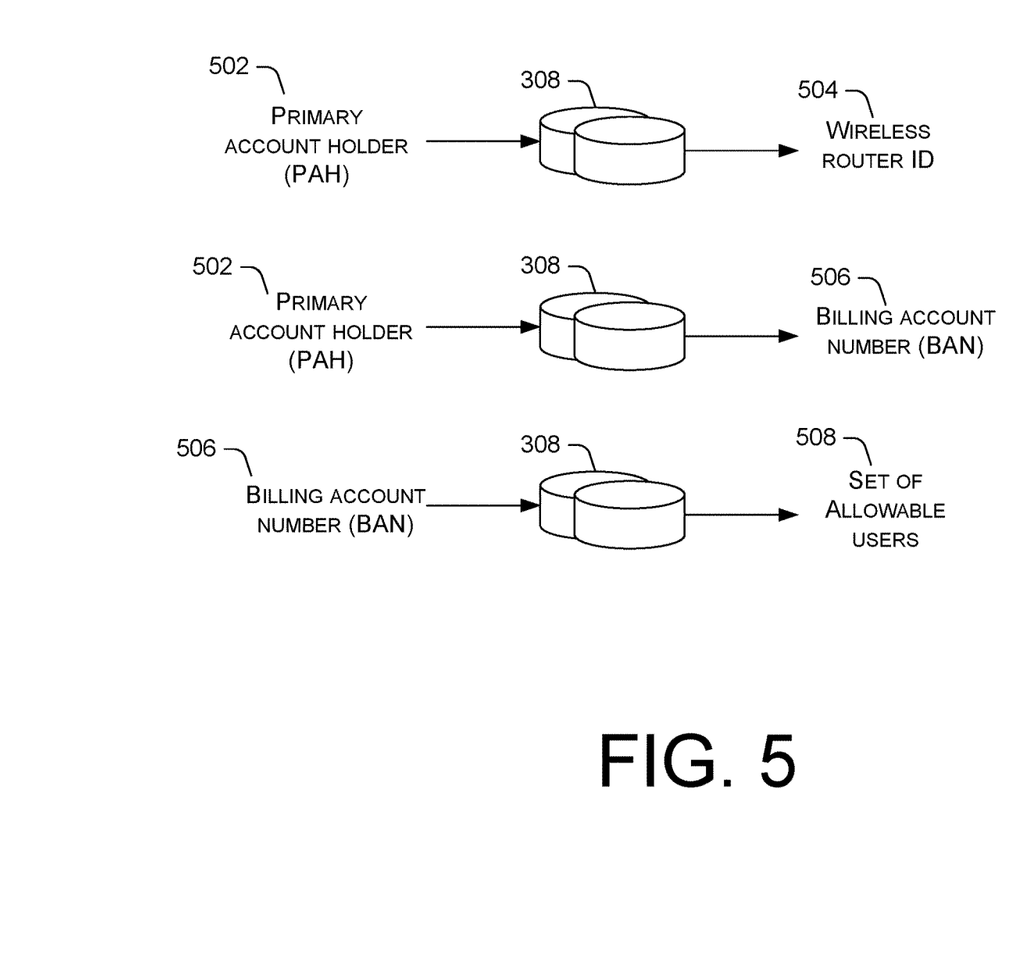
FIG. 5 is a diagram illustrating the querying of a user database by a service management computer platform.

FIG. 5 is a diagram illustrating the querying of one or more user databases by a service management computer platform (e.g., service management computer platform 130, 274, and/or 304). The queries illustrated in FIG. 5 represent various queries that may be performed by the service management computer platform 304 in implementing process block 412 and/or process block 418 of process 400 of FIG. 4.

As described above, the change order 334 received at the service management computer platform 304 of FIG. 3 may include user indicia and the one or more changes to make to the account settings. However, a mapping of which wireless routers are associated with which users may be stored in the one or more user databases 308. Thus, the service management computer platform 304 may query the user databases 308 with the user indicia in order to retrieve the wireless router indicia. In one example, the wireless router indicia includes information necessary for communicating with the wireless router such as a MAC address and/or IP address.

In one aspect, the user 310 is a subscriber associated with an active account with the MNO to provide wireless services to the user 310 via the wireless communication network 102. Thus, in one example the user indicia is a primary account holder (PAH) indicia. That is, the PAH indicia may identify the user 310 as the primary user authorized to make changes to the account and/or the user responsible for making payments to the MNO. As shown in FIG. 5, the service management computer platform 304 may query the user database 308 with the PAH indicia 502 to retrieve the wireless router ID (i.e., the wireless router indicia).

In addition to including a mapping of user indicia to wireless router indicia, the one or more databases 308 may include various other mappings to aid the service management computer platform 304 in completing the update of the account settings. For example, the one or more databases 308 may include a mapping of the PAH indicia 502 to a billing account number (BAN) 506. In one example, the BAN 506 identifies the billing account to which recurring and/or non-recurring charges for services provided by the MNO to user 310 will be billed. In addition, the one or more databases 308 may include a mapping of the BAN 506 to a set of allowable users 508. In one example, the set of allowable users 508 identifies user 310 as well as other users who are covered under the same plan. That is, the set of allowable users 508 may include family members covered under the same family plan provided by the MNO, or employees covered under the same group plan. Thus, a request to change account settings of the wireless router 120 may include querying the one or more user databases 308 with the BAN 506 to retrieve and modify the set of allowable users 508.

Figure 6:
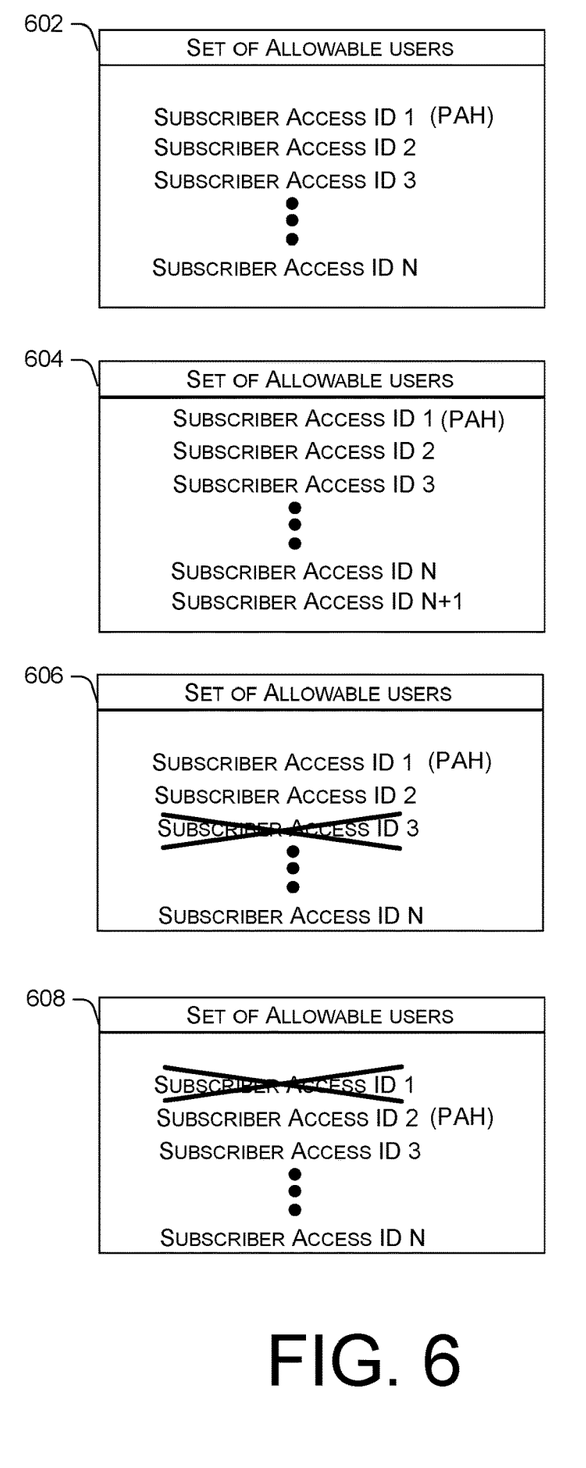
FIG. 6 is a diagram illustrating an initial state of a set of allowable users and several example updated sets of allowable users.

By way of example, FIG. 6 is a diagram illustrating an initial state of a set 602 of allowable users and several example updated sets 604-608 of allowable users. In one aspect, the user indicia that identifies the user 310, as well as the one or more users included in a set of allowable users 602, are identified in the user database 308 by a subscriber access identifier. The subscriber access identifier may be device agnostic for authenticating the user for access to the wireless communication network 102 regardless of whether a wireless device used by the user to access the wireless communication network is a subscriber identity module (SIM) wireless device or a non-SIM wireless device. Thus, the subscriber access identifier may allow identification of a particular user irrespective of what type of device they use to access the wireless communication network 102.

As shown in FIG. 6, the initial set 602 of allowable users includes subscriber access IDs (1)-(N). The initial set 602 also indicates that the user associated with the subscriber access ID (1) is the PAH. Thus, based on this initial set 602 all the users associated with subscriber access IDs (1)-(N) are currently allowed to access and use the wireless router 120. In one example, the initial set 602 represents an initial state of the one or more databases 308. Thus, if any of the operations associated with a transaction to update the account settings fail (e.g., update of the user database fails or update of the wireless router fails) then the one or more user databases 308 are rolled back to this initial state (i.e., revert back to initial set 602).

The request to change the account settings of the wireless router 120 may include a request to make one or more changes to the set of allowable users 602. For example, updated set 604 includes the addition of a user (i.e., subscriber access ID N+1) to the set of allowable users. By way of another example, updated set 606 includes the removal of a user (i.e., subscriber access ID 3) from the set of allowable users.

The updated set 606 illustrates the removal of a user from the set of allowable users when the removed user is not the PAH. However, in some instances, the request to change the account settings may include a request to remove the PAH from the set of allowable users. In this case, a new PAH should be designated. In one example, the account settings update module 326 (see FIG. 3) may designate a new PAH from among the existing users included in the set. That is, as shown in FIG. 6, after removal of the subscriber access ID 1, the user associated with subscriber access ID 2 is designated as the new PAH. In some examples, the newly designated PAH may not necessarily need to be an existing user associated with the account, but instead may be a newly added user. Thus, updating the set of allowable users may include deleting the PAH, adding a new user, and then designating the new user as the PAH.

Figure 7:
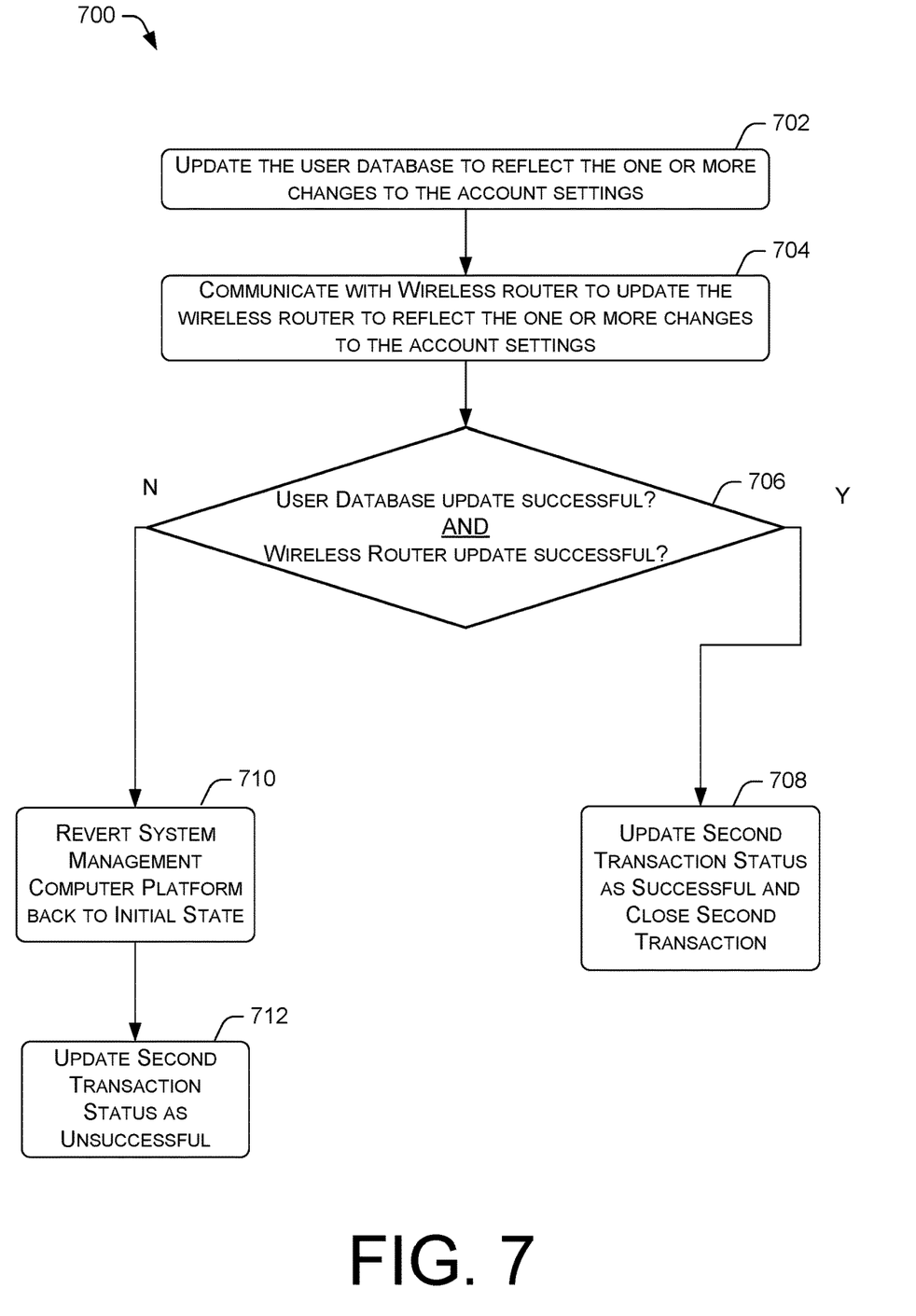
FIG. 7 is a flow diagram of an example process for updating account settings and for updating the status of an associated transaction.

FIG. 7 is a flow diagram of an example process 700 for updating account settings and for updating the status of an associated transaction. Process 700 illustrates further aspects that may be performed by the service management computer platform 130 in performing process blocks 418-420 of process 400.

For example, in process block 702, the service management computer platform 130 may update the one or more user databases 308 to reflect the one or more changes to the account settings (e.g., see updated sets 604-608 of FIG. 6). Next, in process block 704, the service management computer platform 130 communicates with the wireless router 120 to update the wireless router to reflect the one or more changes to the account settings. In decision block 706, the service management computer platform 130 determines both (1) whether the user database update was successful and (2) whether the wireless router update was successful. If both updates were successful then process 700 proceeds to process block 708, where the service management computer platform 130 then updates the second transaction status as successful and closes the second transaction 344.

However, if the service management computer platform 130 determines that any of the updates (i.e., user database and wireless router) were unsuccessful, then process 710 includes reverting the system management computer platform 130 back to an initial state. As described above, reverting the system management computer platform 130 back to an initial state may include rolling back the one or more user databases 308 to the initial set of allowable users (e.g., see initial set 602 of FIG. 6). Next, in process block 712, the system management computer platform 130 may update the status of the second transaction 344 as unsuccessful.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions, which when executed by the at least one processor of a service management computer platform, direct the service management computer platform to:

receive a change order from an issue tracking computer platform, wherein the change order is generated by the issue tracking computer platform in response to an issue tracking event that is monitored in a first transaction of a transaction monitor, wherein the change order includes user indicia that identifies a user of a wireless communication network and one or more changes to make to the account settings of a wireless router, wherein the wireless router is configured to provide wireless access to one or more wireless devices to the wireless communication network;

query a user database with the user indicia, in response to receiving the change order, to retrieve a wireless router indicia corresponding to the wireless router;

initiate a second transaction to monitor a status of the change order, wherein the second transaction is nested within the first transaction;

trigger an update of the account settings of the wireless router, wherein the update includes communicating with the wireless router, based on the wireless router indicia, to update the wireless router to reflect the one or more changes to the account settings; and close the second transaction in response to determining that the update is successful, wherein the first transaction is closed in response to determining that the second transaction is successful.

2. The one or more non-transitory computer-readable media of claim 1, wherein the issue tracking computer platform and the service management computer platform are autonomic to one another.

3. The one or more non-transitory computer-readable media of claim 1, wherein the instructions to initiate the second transaction includes instructions to obtain an initial state of the service management computer platform, wherein execution of the instructions further directs the service management platform to revert to the initial state in response to determining that either of the first or second transactions are unsuccessful.

4. The one or more non-transitory computer-readable media of claim 3, wherein the update includes:

updating the user database to reflect the one or more changes to the account settings; and notifying the user to reset the wireless router, wherein the communicating with the wireless router is in response to the reset of the wireless router.

5. The one or more non-transitory computer-readable media of claim 4, wherein the instructions to revert to the initial state comprise instructions to roll back the user database to a state prior to the updating of the user database to undo the one or more changes to the account settings.

6. The one or more non-transitory computer-readable media of claim 4, wherein the user database includes a mapping of the user indicia to a set of allowable users of the wireless router, wherein updating the user database comprises updating the set of allowable users based on the one or more changes.

7. The one or more non-transitory computer-readable media of claim 6, wherein updating the set of allowable users includes removing a primary account holder (PAH) from the set of allowable users and designating a new PAH.

8. The one or more non-transitory computer-readable media of claim 6, wherein at least one allowable user included in the set of allowable users is identified in the user database by a subscriber access identifier, wherein the subscriber access identifier is device agnostic for authenticating the at least one allowable user to access the wireless communication network regardless of whether a wireless device used by the at least one allowable user to access the wireless communication network is a subscriber identity module (SIM) wireless device or a non-SIM wireless device.

9. The one or more non-transitory computer-readable media of claim 4, wherein notifying the user comprises sending a text message to a device associated with the user.

10. The one or more non-transitory computer-readable media of claim 1, wherein communicating with the wireless router comprises wirelessly communicating with the wireless router via the wireless communication network.

11. The one or more non-transitory computer-readable media of claim 1, further comprising instructions to direct the service management computer platform to:
determine whether the user qualifies to make the one or more changes to the device settings prior to initiating the second transaction, wherein the instructions to initiate the second transaction are in response to determining that the user qualifies to make the one or more changes, and wherein the first transaction is determined to be unsuccessful in response to determining that the user does not qualify to make the one or more changes.

12. The one or more non-transitory computer-readable media of claim 11, wherein determining whether the user qualifies to make the one or more changes comprises at least one of: determining location coordinates of the wireless router, determining one or more neighbor cells of the wireless router, determining a device use address of the wireless router, and determining a usage address of the wireless router.

13. The one or more non-transitory computer-readable media of claim 1, wherein the update further includes updating an emergency service address associated with the wireless router.

14. The one or more non-transitory computer-readable media of claim 1, wherein the user indicia includes a primary account holder (PAH) identifier, and wherein the instructions to query the user database comprises instructions to direct the service management computer platform to:
query the user database with the PAH identifier to retrieve the wireless router indicia;
query the user database with the PAH identifier to retrieve a billing account number (BAN); and
query the user database with the BAN to retrieve a set of allowable users of the wireless router.

15. The one or more non-transitory computer-readable media of claim 14, wherein the issue tracking computer platform is isolated from accessing the user database.

16. The one or more non-transitory computer-readable media of claim 1, wherein the account settings include an access control list of users or devices allowed to use the wireless router, wherein communicating with the wireless router comprises sending an updated access control list to the wireless router based on the one or more changes.

17. An issue tracking computer platform of a wireless communication network, for initiating an update to account settings of a wireless router, the issue tracking computer platform comprising:
at least one processor; and
at least one memory coupled to the at least one processor, the at least one memory having instructions stored therein, which when executed by the at least one processor, direct the issue tracking computer platform to:
generate an issue tracking event in response to a request to modify the account settings of the wireless router, wherein the wireless router is configured to provide wireless access to one or more wireless devices to the wireless communication network;
initiate a first transaction with a transaction monitor to monitor a status of the issue tracking event;
generate and send a change order to a service management computer platform in response to the issue tracking event, wherein the change order includes one or more changes to make to the account settings and user indicia that identifies a user of the wireless communication network, wherein the service management computer platform is configured to perform the one or more changes in a second transaction that is nested within the first transaction, wherein the service management computer platform performs the one or more changes by querying a user database with the user indicia, and wherein the issue tracking computer platform is isolated from accessing the user database; and
update the status of the issue tracking event monitored by the first transaction in response to determining whether the second transaction is successful or unsuccessful.

18. The issue tracking computer platform of claim 17, wherein execution of the instructions further direct the issue tracking computer platform to:
trigger a verification that the issue tracking event may be closed in response to determining that the second transaction is successful; and
close the first transaction in response to determining that the issue tracking event is closed.

19. The issue tracking computer platform of claim 17, wherein the issue tracking computer platform and the service management computer platform are autonomic to one another and wherein the service management computer platform is configured to revert to an initial state in response to determining that either of the first or second transactions are unsuccessful.

20. A computer-implemented method for updating account settings of a wireless router, the method comprising:
generating, by an issue tracking computer platform, an issue tracking event in response to a request to modify the account settings of the wireless router, wherein the wireless router is configured to provide wireless access to one or more wireless devices to a wireless communication network;
initiating a first transaction with a transaction monitor to monitor a status of the issue tracking event;
generating a change order in response to the issue tracking event, wherein the change order includes one or more changes to make to the account settings and user indicia that identifies a user of the wireless communication network;
receiving, at a service management computer platform, the change order from the issue tracking computer platform;
querying, by the service management computer platform, a user database with the user indicia in response to receiving the change order, to retrieve a wireless router indicia corresponding to the wireless router;

initiating a second transaction to monitor a status of the change order, wherein the second transaction is nested within the first transaction;

triggering an update of the account settings of the wireless router, wherein the update includes communicating with the wireless router, based on the wireless router indicia, to update the wireless router to reflect the one or more changes to the account settings;

closing the second transaction in response to determining that the update is successful; and updating the status of the issue tracking event in response to determining whether the second transaction is successful or unsuccessful, and wherein the issue tracking computer platform is isolated from accessing the user database.

* * * * *